(12) United States Patent
Ito et al.

(10) Patent No.: US 10,301,144 B2
(45) Date of Patent: May 28, 2019

(54) WIRE ELECTRODE SUPPLY APPARATUS AND WIRE ELECTRODE SUPPLY METHOD

(71) Applicant: Seibu Electric & Machinery Co., Ltd., Fukuoka (JP)

(72) Inventors: Yoshihiro Ito, Fukuoka (JP); Takashi Mitsuyasu, Fukuoka (JP)

(73) Assignee: Seibu Electric & Machinery Co., Ltd., Fukuoka (JP)

( * ) Notice: Subject to any disclaimer, the term of this patent is extended or adjusted under 35 U.S.C. 154(b) by 113 days.

(21) Appl. No.: 15/319,938

(22) PCT Filed: Apr. 23, 2015

(86) PCT No.: PCT/JP2015/062447
§ 371 (c)(1),
(2) Date: Dec. 19, 2016

(87) PCT Pub. No.: WO2016/117140
PCT Pub. Date: Jul. 28, 2016

(65) Prior Publication Data
US 2017/0129736 A1    May 11, 2017

(30) Foreign Application Priority Data

Jan. 23, 2015  (JP) ................. 2015-011781

(51) Int. Cl.
*B65H 59/00* (2006.01)
*B65H 59/16* (2006.01)
(Continued)

(52) U.S. Cl.
CPC ............... *B65H 59/00* (2013.01); *B23H 7/00* (2013.01); *B23H 7/02* (2013.01); *B23H 7/104* (2013.01);
(Continued)

(58) Field of Classification Search
CPC ........ B65H 59/00; B65H 59/16; B65H 59/18; B65H 59/20; B65H 59/36; B65H 59/06;
(Continued)

(56) References Cited

U.S. PATENT DOCUMENTS 4,379,042 A * 4/1983 Inoue ................. B23H 5/06
125/16.01
4,379,959 A * 4/1983 Inoue ................. B23H 7/102
219/69.12

(Continued)

FOREIGN PATENT DOCUMENTS

CN       101134258 A    3/2008
EP         1894657 A2   3/2008
(Continued)

OTHER PUBLICATIONS

Cober, Greg; Tension Control: Dancer Systems Defined; Published: Apr. 16, 2009; Warner Electric; http://www.pffc-online.com/webexclusives/7076-tension-control-dancer-0409.*

(Continued)

*Primary Examiner* — Michael R Mansen
*Assistant Examiner* — Raveen J Dias
(74) *Attorney, Agent, or Firm* — Rankin, Hill & Clark LLP (57) ABSTRACT

The present invention provides a wire electrode supply apparatus for suppressing wire electrode driving vibration for wire electrodes having a wide range of diameters and formed of various materials, thereby improving processed surface roughness. The wire electrode supply apparatus includes a back tension adjustment unit that adjusts a back tension of the wire electrode drawn from a source bobbin, a tension applying unit, and a constant pressure ejecting unit that ejects the wire electrode with constant pressure and rate after the transference via the tension applying unit and an (Continued)

electrical discharge machining unit. The tension applying unit includes a low tension applying unit that applies a tension to the wire electrode, and a high tension applying unit that can supply a higher tension. After the high tension applying unit supplies a tension, the low tension applying unit supplies a tension. Otherwise, only the low tension applying unit supplies a tension.

20 Claims, 7 Drawing Sheets

(51) Int. Cl.
  *B65H 59/22* (2006.01)
  *B65H 59/38* (2006.01)
  *B65H 23/00* (2006.01)
  *B23H 7/02* (2006.01)
  *B23H 7/10* (2006.01)
  *B23H 7/12* (2006.01)
  *B23K 9/12* (2006.01)
  *B23K 9/013* (2006.01)
  *B23K 9/133* (2006.01)
  *B65H 59/36* (2006.01)
  *B23H 7/00* (2006.01)

(52) U.S. Cl.
  CPC .............. *B23H 7/12* (2013.01); *B23K 9/013* (2013.01); *B23K 9/12* (2013.01); *B23K 9/133* (2013.01); *B65H 23/00* (2013.01); *B65H 59/16* (2013.01); *B65H 59/22* (2013.01); *B65H 59/36* (2013.01); *B65H 59/382* (2013.01); *B65H 59/387* (2013.01); *B65H 2701/36* (2013.01)

(58) Field of Classification Search
  CPC .. B65H 59/382; B65H 59/387; B65H 23/063; B65H 23/066; B65H 23/08; B65H 23/085; B65H 23/10; B65H 23/105; B65H 23/14; B65H 23/1825; B65H 23/185; B65H 23/1888; B65H 23/1955; B65H 75/4484; B65H 23/044; B65H 23/06; B65H 23/18; B65H 59/02; B65H 59/10; B65H 59/40; B65H 20/005; B65H 20/30; B65H 23/038; B65H 3/044; B23K 9/013; B23K 9/12; B23K 9/133; B23K 9/28; B23K 9/30; B23H 7/00; B23H 7/02; B23H 7/08; B23H 7/10; B23H 7/04; B23H 7/104; B23H 5/04; B23H 7/06; B23H 55/10; B23H 5/10; B23H 7/102

USPC .............. 242/419, 419.1, 420, 420.5, 420.6
  See application file for complete search history.

(56) References Cited

U.S. PATENT DOCUMENTS

| | | | |
|---|---|---|---|
| 4,547,647 A | | 10/1985 | Schneider |
| 4,598,189 A | * | 7/1986 | Inoue ..................... B23H 7/102 204/206 |
| 4,652,716 A | * | 3/1987 | Schneider ............. B23H 7/102 219/69.12 |
| 5,039,834 A | * | 8/1991 | Obara ...................... B23H 7/04 219/69.12 |
| 5,080,295 A | * | 1/1992 | Hongo ................... H02K 15/09 242/155 M |
| 9,653,864 B2 | * | 5/2017 | Mizutani ................ B65H 57/04 |
| 2007/0228016 A1 | * | 10/2007 | Kita ........................ B23H 7/104 219/69.12 |
| 2008/0053963 A1 | | 3/2008 | Yushi |
| 2008/0092510 A1 | * | 4/2008 | Hsu ........................ B65H 59/36 57/58.83 |
| 2014/0008329 A1 | * | 1/2014 | Dohi ........................ B23H 1/10 219/69.11 |

FOREIGN PATENT DOCUMENTS

| | | |
|---|---|---|
| JP | 56-152534 | 11/1981 |
| JP | 01199726 | 8/1989 |
| JP | 04-250924 | 9/1992 |
| JP | 04250925 | 9/1992 |
| JP | 0560729 | 8/1993 |
| JP | 06-329336 | 11/1994 |
| JP | 07-290321 | 11/1995 |
| JP | 07290320 | 11/1995 |
| JP | 08-294824 | 11/1996 |
| JP | 11-77438 | 3/1999 |
| JP | 2000-246545 | 9/2000 |
| JP | 2002239841 A2 | 8/2002 |
| JP | 200855539 | 3/2008 |

OTHER PUBLICATIONS

International Search Report dated Jul. 28, 2015 filed in PCT/JP2015/062447.

Japanese Office Action (JPOA) dated Feb. 12, 2019 issued in the corresponding Japanese patent application No. JP2015-011781 and its English translation.

* cited by examiner

WIRE ELECTRODE SUPPLY APPARATUS AND WIRE ELECTRODE SUPPLY METHOD

TECHNICAL FIELD

The present invention relates to a wire electrode supply apparatus and a wire electrode supply method, and particularly to a wire electrode supply apparatus or the like included in a wire electrical discharge machining device including an electrical discharge machining unit configured to provide electrical discharge machining using a wire electrode.

BACKGROUND ART

A wire electrical discharge machining device is configured as an electrical discharge machining device using a wire as an electrode. Such a wire electrical discharge machining device generates an electrical discharge between a wire electrode and a workpiece (machining target) while supplying the wire electrode (see Patent document 1, 2, or the like).

Figure 7:
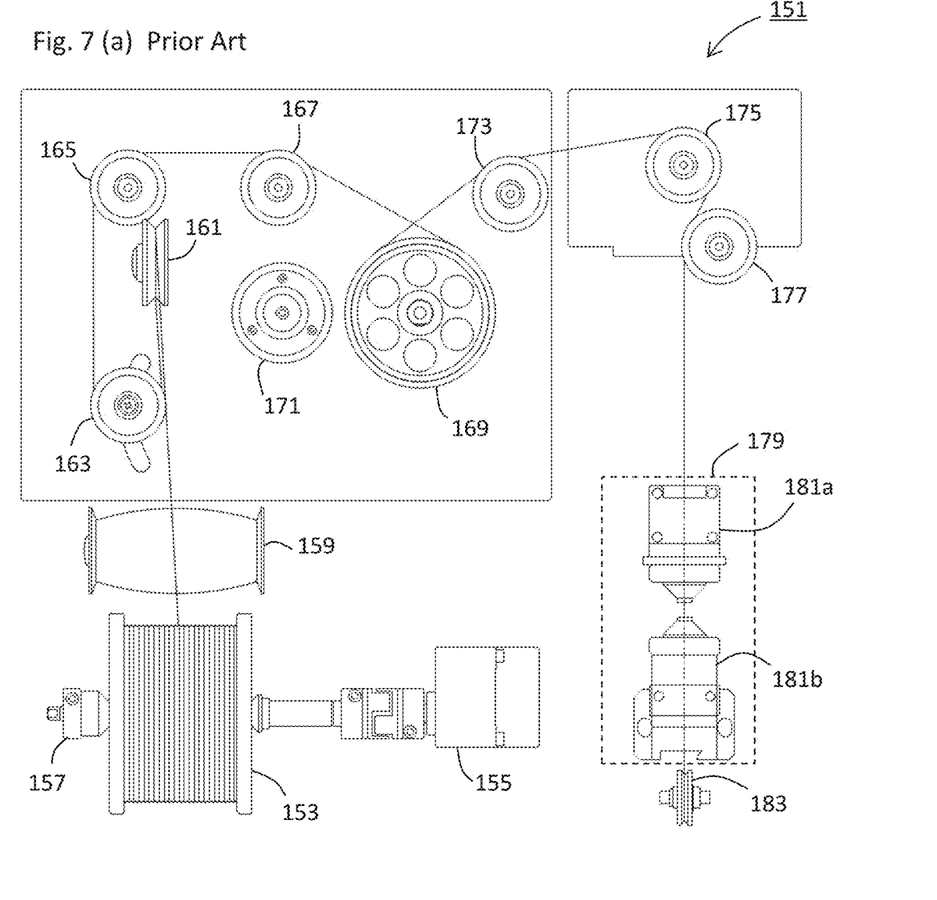
FIG. 7 is a diagram showing an example of a wire electrode driving system employed in a conventional wire electrical discharge machining device 151.

FIG. 7 is a diagram showing an example of a wire electrode driving system employed in a conventional wire electrical discharge machining device 151. Referring to FIG. 7(a), a source bobbin 153 stores a wire electrode in a wound form. A source bobbin motor 155 applies a back tension to the wire electrode drawn from the source bobbin 153. A bobbin nut 157 is arranged so as to fix the source bobbin 153 to the source bobbin motor 155. The wire electrode drawn from the source bobbin 153 is transferred via a pillow roller 159, a guide roller 161, and a dancer roller 163, and reaches a brake pulley 169 via guide rollers 165 and 167. A brake roller 171 is pressed in contact with the brake pulley 169 such that the wire electrode is pinched between the brake roller 171 and the brake pulley 169, thereby further applying tension to the wire electrode. The brake roller 171 employs a brake motor (hysteresis motor). In contrast, conventionally, the brake pulley 169 includes no brake motor as its built-in component. The wire electrode transferred via the brake pulley 169 is further transferred via the guide rollers 173, 175, and 177, and reaches an electrical discharge machining unit 179. The electrical discharge machining unit 179 includes an upper head 181a and a lower head 181b, and provides electrical discharge machining using a wire electrode.

Referring to FIG. 7B, after the wire electrode is used in the electrical discharge machining, the direction in which the wire electrode is transferred is changed from a vertical direction to a horizontal direction by means of a lower head roller 183. Subsequently, the wire electrode is transferred via a nozzle holder 185, and reaches a winding unit 187. The winding unit 187 includes a pressing roller 189a and a winding roller 189b. The pressing roller 189a and the winding roller 189b eject the wire electrode in a state in which the wire electrode is pinched between them with a constant pressure. Finally, the wire electrode ejected from the winding unit 187 is ejected to a used wire hopper 193.

CITATION LIST

Patent Literature

[Patent Document 1]
  Japanese Unexamined Utility Model Application Publication No. H05-60729
[Patent Document 2]
  Japanese Patent Application Laid-Open No. H01-199726

SUMMARY OF INVENTION

Technical Problem

However, in recent years, the number of items that can be employed as such a wire electrode, which can have a wide range of diameters and can be formed of various materials, has been increasing. This allows wire tension adjustment to have a wider adjustment range. In particular, there is a demand for machining a micro structure and a demand for machining a narrow slit portion with improved surface roughness. Such demands require a stable wire driving system configured to transfer a fine wire electrode having a diameter of 0.1 mm or less with low tension.

Accordingly, it is a purpose of the present invention to provide a wire electrode supply apparatus or the like which is capable of suppressing vibration in the wire electrode driving operation for various kinds of wire electrodes having a wide range of diameters and formed of various kinds of materials, thereby providing improved processed surface roughness.

Solution of Problem

A first aspect in accordance with the present invention provides a wire electrode supply apparatus employed in a wire electrical discharge machining device comprising an electrical discharge machining unit that provides electrical discharge machining using a wire electrode, the wire electrode supply apparatus comprising: a back tension adjustment unit that adjusts a back tension applied to the wire electrode drawn from a source bobbin; a tension applying unit that applies a tension to the wire electrode drawn from the source bobbin; and a constant pressure ejecting unit that ejects the wire electrode in a state in which the wire electrode is pinched with a constant pressure after the wire electrode passes through the tension applying unit and the electrical discharge machining unit, wherein the tension applying unit comprises a high tension applying unit and a low tension applying unit each configured to apply a tension to the wire electrode, wherein the high tension applying unit is configured to apply a tension that is higher than that which is applied by the low tension applying unit, and wherein the tension applying unit operates such that, after the high tension applying unit applies a tension to the wire electrode drawn from the source bobbin, the low tension applying unit applies a tension to the wire electrode, or otherwise operates such that only the low tension applying unit applies a tension to the wire electrode and the high tension applying unit applies no tension to the wire electrode.

A second aspect in accordance with the present invention provides the wire electrode supply apparatus according to the first aspect, wherein the source bobbin, the high tension applying unit, and the low tension applying unit have rotational axes that are in parallel with each other.

A third aspect in accordance with the present invention provides the wire electrode supply apparatus according to the first or second aspect, wherein the low tension applying unit is arranged on a straight line that passes through an upper head and a lower head of the electrical discharge machining unit such that it is positioned on an upper side of the upper head.

A fourth aspect in accordance with the present invention provides the wire electrode supply apparatus according to any one of the first through third aspects, wherein the low tension applying unit is configured to supply a tension in a range up to a reference tension value, wherein the low tension applying unit provides a tension control value in a stepwise manner that is finer than that provided by the high tension applying unit, wherein, when a tension to be applied to the wire electrode is smaller than a switching tension value that is equal to or otherwise lower than the reference tension value, only the low tension applying unit applies a tension to the wire electrode drawn from the source bobbin, and the high tension applying unit supplies no tension, and wherein, when the tension to be applied to the wire electrode is larger than the switching tension value, the low tension applying unit applies a tension to the wire electrode after the high tension applying unit supplies a tension.

A fifth aspect in accordance with the present invention provides the wire electrode supply apparatus according to any one of the first through fourth aspects, wherein the low tension applying unit comprises a low-tension brake roller configured to transfer the wire electrode, wherein the high tension applying unit comprises: a high-tension brake pulley having a diameter that is greater than that of the low-tension brake roller, and configured to transfer the wire electrode; and at least one small-diameter wire pressing roller that presses the wire electrode in contact with an outer circumference portion of the high-tension brake pulley so as to pinch the wire electrode, thereby applying a tension to the wire electrode.

A sixth aspect in accordance with the present invention provides the wire electrode supply apparatus according to any one of the first through fifth aspects, wherein the high tension applying unit employs a hysteresis brake, and wherein the low tension applying unit employs a powder brake.

A seventh aspect in accordance with the present invention provides the wire electrode supply apparatus according to any one of the first through sixth aspects, wherein the back tension adjustment unit comprises a servo motor directly connected to the source bobbin, and a dancer roller that can be moved in a vertical direction, wherein a back tension applied to the wire electrode is set by applying a weight to the dancer roller, and wherein a vertical movement of the dancer roller is fed back to the servo motor so as to adjust the back tension.

A eighth aspect in accordance with the present invention provides the wire electrode supply apparatus according to the seventh aspect, wherein the wire electrode is applied to the dancer roller through multiple turns, so as to reduce the weight to be applied to the wire electrode.

A ninth aspect in accordance with the present invention provides the wire electrode supply apparatus according to any one of the first through eighth aspects, wherein the constant pressure ejecting unit comprises: a lower head roller that is arranged on a downstream side of the lower head of the electrical discharge machining unit, and that changes a direction in which the wire electrode is transferred from a vertical direction to a horizontal direction; an ejecting unit that holds the wire electrode transferred in the horizontal direction such that the wire electrode is pinched between two rollers with a constant setting pressure determined based on the electrode wire, and that ejects the wire electrode with a constant setting rate; and a chute that takes in the wire electrode ejected in a state in which the electrode wire is pinched by means of the two rollers.

A tenth aspect in accordance with the present invention provides the wire electrode supply apparatus according to any one of the first through ninth aspects, further comprising a guide roller having a trapezoidal shape in cross-section, and arranged such that its small-diameter portion as viewed in cross-section is in contact with the wire electrode.

A eleventh aspect in accordance with the present invention provides a wire electrode supply method employed in a wire electrical discharge machining device comprising an electrical discharge machining unit that provides electrical discharge machining using a wire electrode, the wire electrode supply method comprising: back tension adjustment in which a back tension adjustment unit adjusts a back tension applied to the wire electrode drawn from a source bobbin; tension applying in which a tension applying unit adjusts a tension applied to the wire electrode drawn from the source bobbin; and constant pressure ejecting in which a constant pressure ejecting unit ejects the wire electrode with a constant rate in a state in which the wire electrode is pinched with a constant pressure after the wire electrode passes through the tension applying unit and the electrical discharge machining unit, wherein the tension applying unit comprises a high tension applying unit and a low tension applying unit each configured to apply a tension to the wire electrode, wherein the low tension applying unit is configured to supply a tension in a range up to a reference tension value, wherein the high tension applying unit is configured to supply a tension that is higher than the reference tension value, and wherein, in the tension applying, when the tension applying unit is to supply a tension that is higher than a switching tension value that is equal to or lower than the reference tension value, the low tension applying unit applies a tension to the wire electrode after the high tension applying unit applies a tension to the wire electrode, and wherein, in the tension applying, when the tension applying unit is to supply a tension that is lower than the switching tension value, only the low tension applying unit applies a tension to the wire electrode and the high tension applying unit applies no tension to the wire electrode.

Advantageous Effects of Invention

With each aspect of the present invention, in a case in which a back tension is applied to the electrode wire on the source bobbin side, and the constant pressure ejecting unit pinches the wire electrode with a constant pressure and ejects the wire electrode with a constant rate, by supplying a tension by means of the high tension applying unit and the low tension applying unit, such an arrangement allows the wire vibration to be dramatically reduced. For example, in a case in which a low tension is applied to a wire electrode having a small diameter of 0.1 mm or less, such an arrangement provides machining using only the low tension applying unit without involving the high tension applying unit configured to apply a high tension, thereby dramatically reducing the wire vibration. In contrast, in a case in which a high tension is to be applied, the high tension applying unit controls and applies a major part of the tension in coarse increments. Subsequently, the low tension applying unit arranged at a position that is closer to the electrical discharge machining unit controls and applies a low tension in fine increments. Thus, such an arrangement provides fine tension setting even if a high tension is to be applied. It has been confirmed that such an arrangement provides reduced wire vibration, which is ⅓ or less of that provided by conventional techniques, which is a marked advantage as described later.

Furthermore, with the second aspect of the present invention, by arranging the source bobbin such that its rotational axis is positioned in parallel with the rotational axes of the high tension applying unit and the low tension applying unit, such an arrangement is capable of suppressing the occurrence of twisting in the wire electrode.

Furthermore, with the third aspect of the present invention, by controlling the tension in fine increments on the upper side of the upper head, such an arrangement is capable of dramatically suppressing wire vibration.

Furthermore, with the fourth aspect of the present invention, in a case in which a tension is not applied by means of the high tension applying unit, the low tension applying unit is operated using the hysteresis brake in a non-excited state. In contrast, in a case in which a tension is to be applied by means of the high tension applying unit, a large-diameter pulley is controlled by means of the electromagnetically driven hysteresis brake or the like, and a small-diameter roller is pressed into contact with the outer circumferential face of the large-diameter pulley. Such an arrangement prevents the wire electrode from loosening. Furthermore, with the fifth and sixth aspects of the present invention, the high tension applying unit and the low tension applying unit are each configured based on their properties, thereby providing improved precision.

Furthermore, with the seventh aspect of the present invention, by controlling the amount of back tension and its fluctuation by means of the dancer roller, such an arrangement allows the dancer roller to prevent the wire electrode from loosening from the source bobbin. In addition, such an arrangement is capable of stabilizing tension fluctuation that occurs in the wire electrode before it is transferred to the tension applying unit. Furthermore, with the eighth aspect of the present invention, by applying the wire electrode to the dancer roller such that it is wound on the dancer roller multiple times, such an arrangement is capable of reducing the weight to be applied to the wire electrode.

Furthermore, with the ninth aspect of the present invention, the wire electrode is ejected using the chute in addition to the rollers. Such an arrangement is capable of easily ejecting a wire electrode even if the wire electrode has a small diameter.

Furthermore, with the tenth aspect of the present invention, such an arrangement is capable of suppressing fluctuation in contact resistance due to irregularities in the diameter of the wire electrode.

BRIEF DESCRIPTION OF DRAWINGS

FIG. 3(*a*) shows a hysteresis brake for a high-tension brake pulley, and FIG. 3(*b*) shows a power brake for a low-tension brake roller.

DESCRIPTION OF EMBODIMENTS

Description will be made below regarding examples of the present invention. It should be noted that an embodiment of the present invention is not restricted to such examples described below.

EXAMPLES

Figure 1:
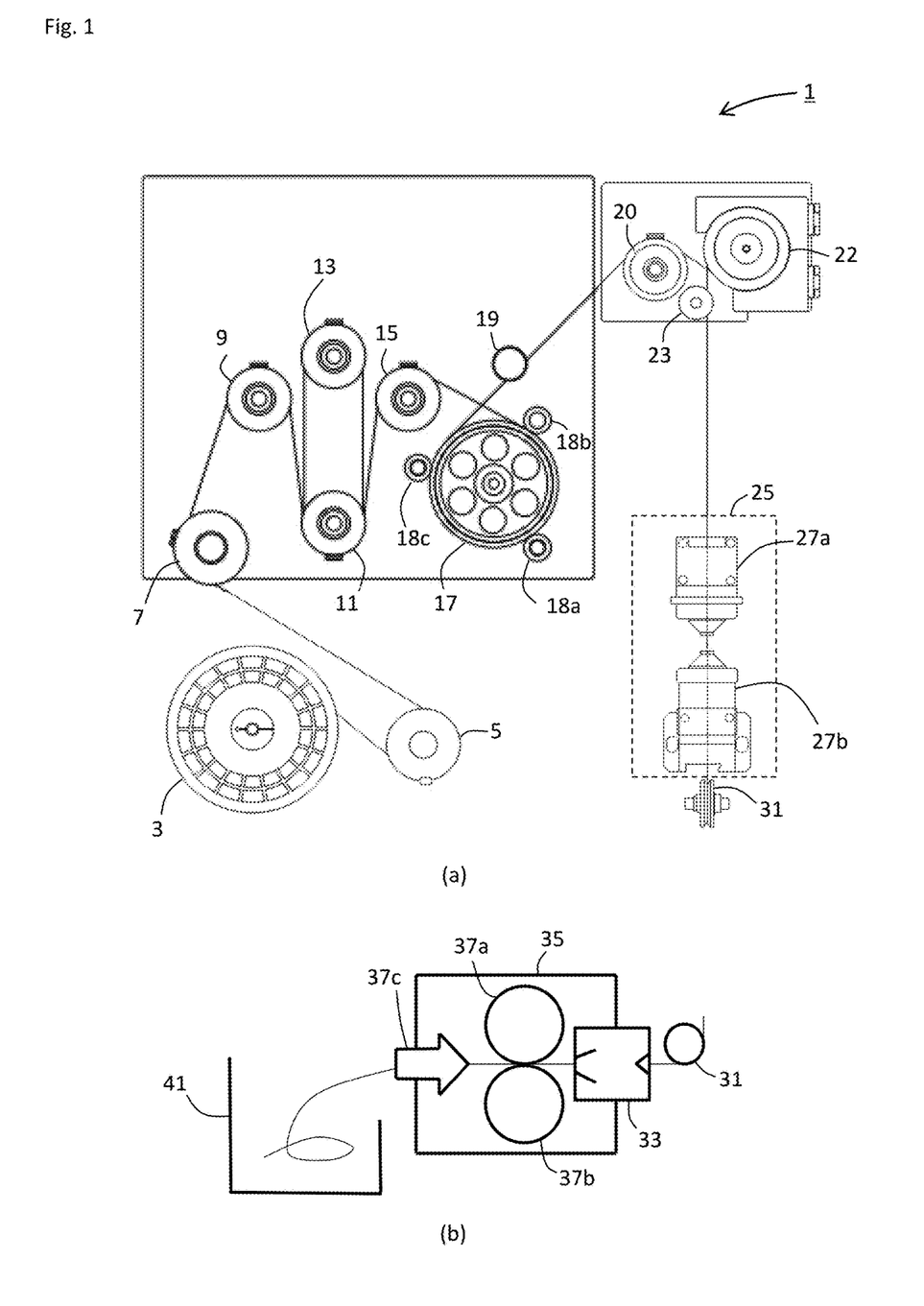
FIG. 1 is a diagram showing an example of a configuration of a wire electrical discharge machining device 1 according to an embodiment of the present invention.

FIG. 1 is a diagram showing an example of a configuration of a wire electrical discharge machining device according to an embodiment of the present invention. FIG. 1A shows the lower head roller 31 and an upstream stage thereof. FIG. 1B shows a lower head roller 31 and a downstream stage thereof. The wire electrical discharge machining device 1 includes a source bobbin 3, a pillow roller 5, guide rollers 7 and 9, a dancer roller 11, guide rollers 13 and 15, a high-tension brake pulley 17, small-diameter wire pressing rollers 18*a*, 18*b*, and 18*c*, a felt pad 19, a guide roller 20, a low-tension brake roller 22, a felt pad 23, an electrical discharge machining unit 25, a lower head roller 31, a nozzle holder 33, a pressing roller 37*a*, a winding roller 37*b*, a chute 37*c*, and a used wire hopper 41. Each roller is provided with a roller felt member.

It should be noted that, in some cases, there is a difference in the function of components having a similar appearance between the wire electrical discharge machining device shown in FIG. 1 and that shown in FIG. 7.

The source bobbin 3 shown in FIG. 1 corresponds to the source bobbin 153 shown in FIG. 7. However, there is a difference in the orientation of this component between an arrangement shown in FIG. 1 and an arrangement shown in FIG. 7. The source bobbin 153 shown in FIG. 7 has a rotational axis extending in the lateral direction. Accordingly, after the wire electrode is drawn in the longitudinal direction, the wire electrode is transferred toward the right side in the drawing, leading to rotation (twisting) of the wire electrode with the wire longitudinal direction as its twisting axis. Such twisting leads to distortion occurring in the wire electrode. Such distortion leads to a problem in that the wire electrode is supplied in a curved form having a certain directionality. For example, in an automatic wire connection system, this has an adverse effect on the directional straightness of a wire electrode after the wire electrode is annealed. Also, this leads to a difference in the diameter of the wire electrode between its positions. This can result in an adverse effect on the processed surface. In contrast, the source bobbin 3 shown in FIG. 1 has a rotational axis that is in parallel with those of the low-tension brake roller 22, the high-tension brake pulley 17, and the like, for example. Such an arrangement provides a reduction in twisting occurring in the wire electrode, thereby providing improved machining performance. An unshown source bobbin motor applies a back tension to the wire electrode drawn from the source bobbin 3. The source bobbin is fixed to the source bobbin motor by means of a bobbin nut.

The back tension adjustment unit draws the wire electrode from the source bobbin 3. In this stage, in some cases, such an arrangement has a problem in that the source bobbin 3 comes to be in a loosely wound state, a problem of back tension fluctuation which leads to fluctuation in the wire electrode transfer rate, or the like. The back tension adjustment unit absorbs such fluctuation so as to suppress such fluctuation in the back tension or the like, thereby suppressing an adverse effect on the tension applied to the wire electrode.

The pillow roller 5 shown in FIG. 1 corresponds to the pillow roller 155 shown in FIG. 7. However, the pillow roller 5 is arranged such that its rotational axis extends in a direction that is orthogonal to the drawing, thereby suppressing the occurrence of twisting of the wire electrode.

The wire electrode drawn from the source bobbin 3 shown in FIG. 1 is transferred via the pillow roller 5 and the guide roller 7, and reaches the high-tension brake pulley 17 via the guide rollers 9, 13, and 15, and the dancer roller 11. Here, the guide rollers 9, 13, and 15, and the dancer roller 11 supply a back tension.

The dancer roller 11 is configured such that it can be moved in the vertical direction. Weight is applied to the dancer roller 11 so as to set a back tension to the wire drawn from the source bobbin 3. Furthermore, the vertical movement of the dancer roller 11 is detected. The vertical movement thus detected is fed back to the source bobbin motor so as to adjust the back tension. Furthermore, with such an arrangement shown in FIG. 1, the wire is double-wound, thereby further reducing the back tension. The present inventors have found by experiment that, in a case in which a light weight that is less than 80 g is applied to the dancer roller 11 in a simple manner, such an arrangement is not capable of providing synchronous matching between the vertical movement of the dancer roller 11 and the vertical movement of the wire electrode, which can readily lead to the occurrence of an out-of-control un-coordinated movement state. In order to solve such a problem, the wire electrode is applied to the dancer roller 11 such that it is wound around the dancer roller 11 multiple times so as to reduce the weight applied to the wire electrode. For example, in a case in which the wire is double-wound, such an arrangement is capable of reducing the weight applied to the wire electrode up to half the weight provided in a case in which the wire electrode is applied to the dancer roller 11 in a simple manner. In a case in which the wire is double-wound, such an arrangement provides a minimum tension setting value of 80 g with additional weight of 160 g.

It should be noted that, with regard to the tension measurement values obtained using a measurement apparatus configured to measure tension in a state in which a wire is pinched, there was variation due to irregularities, and the results ranged from 100 g to 120 g. Typically, commercially available wire electrodes have a diameter of 0.05 mm or more. A tension of 800 N/mm$^2$ or more can be applied to a brass wire having a diameter of 0.1 mm or less. Accordingly, a wire electrode having a diameter of 0.05 mm has a tension strength of 1.57 N or more (=(tension*cross-sectional area), which represents a weight limit that ensures the condition of use of a given wire electrode within its elastic range). Thus, the wire electrode supply apparatus is required to set a tension of 1.57 N or less, and to transfer a wire electrode with a tension thus set in a stable state. In practice, such a wire electrode supply apparatus provides a minimum tension on the order of 120 gf (which is approximately equal to 1.17 N), which was obtained by actual measurement.

In FIG. 1, the high-tension brake pulley 17 and the small-diameter wire pressing rollers 18a, 18b, and 18c, are configured to supply a high tension. The high-tension brake pulley 17 has a large size as compared with the guide roller, and applies a high tension to the electrode wire. In this embodiment, the high-tension brake pulley 17 supplies a tension ranging between 600 gf and 2,000 gf. Such components correspond to the brake roller 171 shown in FIG. 7.

Figure 3:
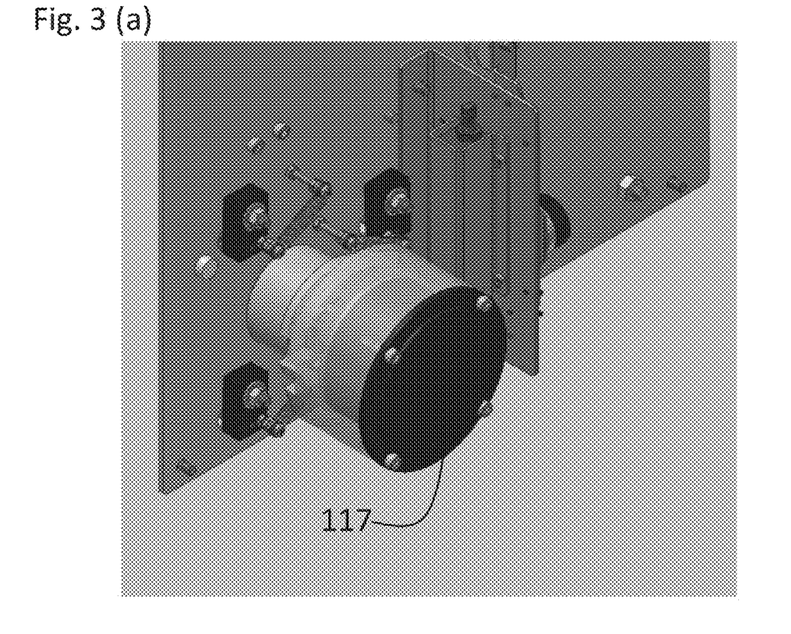

As shown in FIG. 3A, the high-tension brake pulley 17 is configured as a hysteresis brake 117. The hysteresis brake 117 is configured to supply a braking load in a contactless manner by means of magnetic friction. Such a hysteresis brake is capable of providing a braking load regardless of the rotational speed. Furthermore, when a magnetic pole is not excited, such an arrangement allows the rotor of the brake to be rotated freely. That is to say, such an arrangement is capable of setting the high-tension brake pulley 17 to both a state in which it supplies a braking load and a state in which it supplies no braking load. Furthermore, the wire electrode wound around the high-tension brake pulley 17 is pinched between each small-diameter wire pressing rollers 18a, 18b, 18c and the high-tension brake pulley 17. Such an arrangement prevents the wire electrode from detaching from the high-tension brake pulley, thereby applying a braking force to the wire electrode in a stable state. In contrast, when the magnetic pole of the hysteresis brake provided to the high-tension brake pulley 17 is not excited, such an arrangement is capable of providing a state in which no tension is supplied.

The wire electrode is transferred from the high-tension brake pulley 17 and the guide roller 20, and reaches the low-tension brake roller 22. The low-tension brake roller 22 has a tension control value width that is narrower than that of the high-tension brake pulley 17. Furthermore, the low-tension brake roller 22 can provide only a low tension as compared with that which can be provided by the high-tension brake pulley 17. In the present embodiment, the low-tension brake roller 22 is capable of supplying a tension of 700 gf or less. The low-tension brake roller 22 is arranged as an intermediate component arranged between the high-tension brake pulley and the electrical discharge machining unit 25. Furthermore, the low-tension brake roller 22 is arranged at a position on the upper side of the upper head 27a along the vertical direction, and is designed such that, in a region between the low-tension brake roller 22 and the electrical discharge machining unit 25, the number of components such as guide rollers or the like via which the wire electrode is transferred is as small as possible. The low-tension brake roller 22 applies a low tension to the electrode wire by means of a powder brake.

There is no component in FIG. 7 that corresponds to the low-tension brake roller 22. As shown in FIG. 3B, the low-tension brake roller 22 is configured as a power brake 122. The powder brake 122 provides a braking load by means of physical friction using a magnetic powder or the like. Such a powder brake provides higher controllability than that provided by a hysteresis brake, and is capable of generating a stable braking force with low fluctuation.

Description will be made regarding an example of a tension control operation provided by the high-tension brake pulley 17 and the low-tension brake roller 22. A tension that can be provided by the low-tension brake roller 22 is selected as a reference tension value. Furthermore, a switching tension value is determined such that it is equal to or smaller than the reference tension value. For example, in a case in which the reference tension value is set to 7 N, the switching tension value is set to 6.86 N. When a tension that is lower than the switching tension value is applied, only the low-tension brake roller 22 supplies a tension and the high-tension brake pulley 17 and the small-diameter wire pressing rollers 18 supply no tension. In contrast, when a tension that is higher than the switching tension value is applied, the high-tension brake pulley 17 and the small-diameter wire pressing rollers 18 also supply a tension in addition to the low-tension brake roller 22. Such an arrangement allows tension control to be performed with fine increments of control values for the tension control even in a case in which a high tension is supplied. Such an arrangement is capable of dramatically suppressing wire vibration in a case in which both the high-tension brake pulley 17 and the low-tension brake roller 22 are operated, as well as a case in which only the low-tension brake roller 22 is operated.

It should be noted that, in a case in which only a low tension is to be applied to the wire electrode, i.e., when only the low-tension brake roller 22 is to be operated, the low-tension brake roller 22 applies a tension to the wire electrode drawn from the guide roller 19. In this case, the wire electrode may be transferred without involving the high-tension brake pulley 17, for example.

The low-tension brake roller 22 is arranged at a position on the upper side of the upper head 27a along a line that passes through the upper head 27a and the lower head 27b of the electrical discharge machining unit 25. The wire electrode transferred via the low-tension brake roller 22 is further transferred via the felt pad 23 such that it passes through the upper head 27a from its upper side along the vertical direction, and such that it passes through the lower head 27b. The electrical discharge machining unit 25 provides electrical discharge machining using the wire electrode that passes through the upper head 27a and the lower head 27b. After the wire electrode passes through the lower head 27b, the direction in which the wire electrode is transferred is changed by means of the lower head roller 31 from the vertical direction to the horizontal direction.

Referring to FIG. 1B, the wire electrode transferred via the lower head roller 31 reaches a winding unit 35 via the nozzle holder 33. The winding unit 35 includes a pressing roller 37a, a winding roller 37b, and a chute 37c. The pressing roller 37a and the winding roller 37b pinch the wire electrode with a predetermined constant pressure, and draw and eject the wire electrode. The chute 37c takes in the wire electrode ejected from the pressing roller 37a and the winding roller 37b, and ejects the wire electrode externally, which is performed with high efficiency. In particular, with such an arrangement, the winding operation is effectively performed for a wire electrode having a small diameter. Finally, the wire electrode thus ejected from the winding unit 35 is ejected to the used wire hopper 41, and is temporarily stored in the used wire hopper 41.

Figure 2:
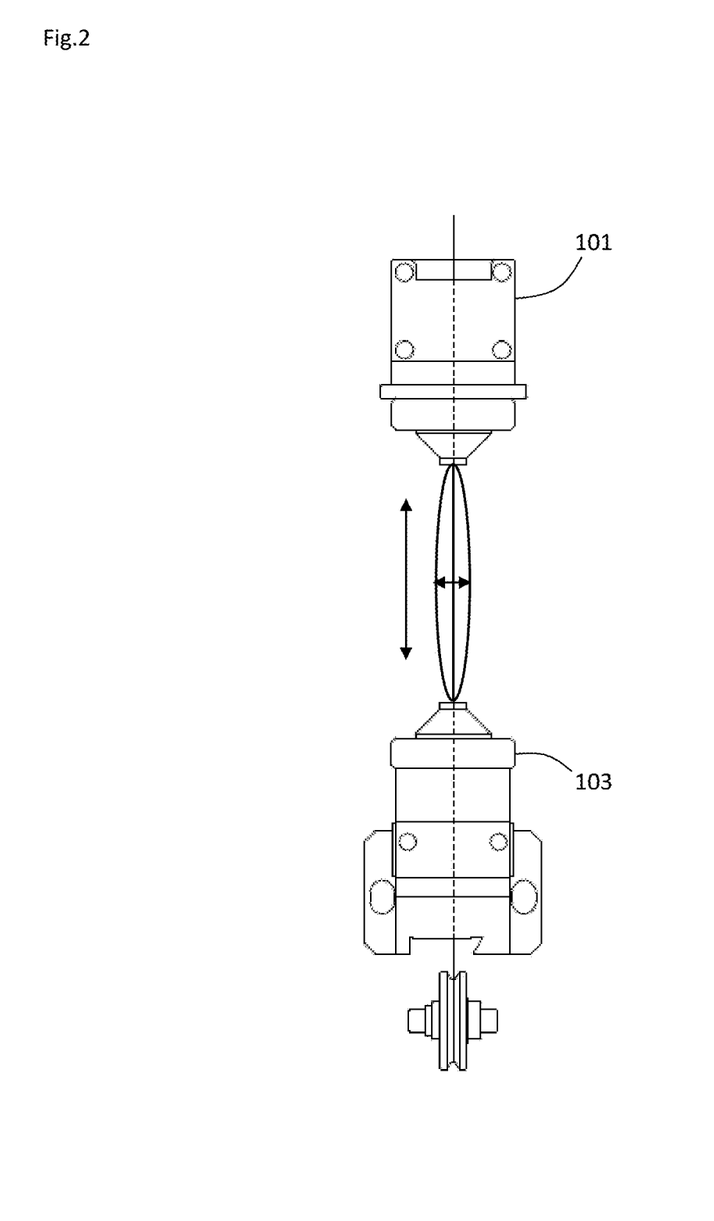
FIG. 2 is a diagram for describing the wire amplitude and tension vibration.

FIG. 2 is a diagram for describing the wire amplitude and tension fluctuation. FIG. 2 shows a wire electrode positioned between the upper head 101 and the lower head 103, and vibration in the lateral direction is the wire amplitude. The tension fluctuates along the vertical direction. Table 1 shows a comparison result of the measurement values. The conventional wire electrical discharge machining device shown in FIG. 7 provides a wire amplitude of 2 μm (see FIG. 4). In contrast, the wire electrical discharge machining device shown in FIG. 1 provides a wire amplitude of 0.6 μm (Table 1). That is to say, the wire electrical discharge machining device shown in FIG. 1 is capable of providing a reduced wire amplitude, which is approximately ⅓ of that provided by conventional techniques over the overall length. Table 1 is obtained by summarizing the vibration measurement results shown in FIG. 4.

TABLE 1

| GUIDE DIAMETER | MEASUREMENT RESULT |
| --- | --- |
| Φ0.205 | 0.61 μm |
| Φ0.205 (NEW) | 0.57 μm |
| Φ0.203 | 0.63 μm |

Figure 4:
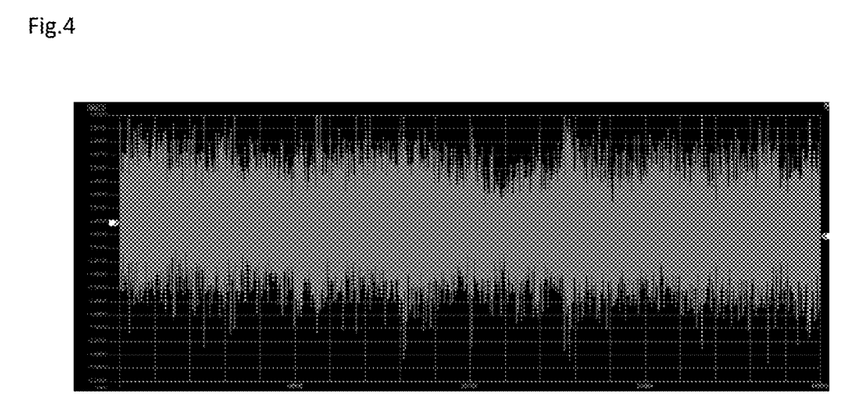
FIG. 4 is a graph showing the wire amplitude provided by the conventional wire electrical discharge machining device shown in FIG. 7.
Figure 5:
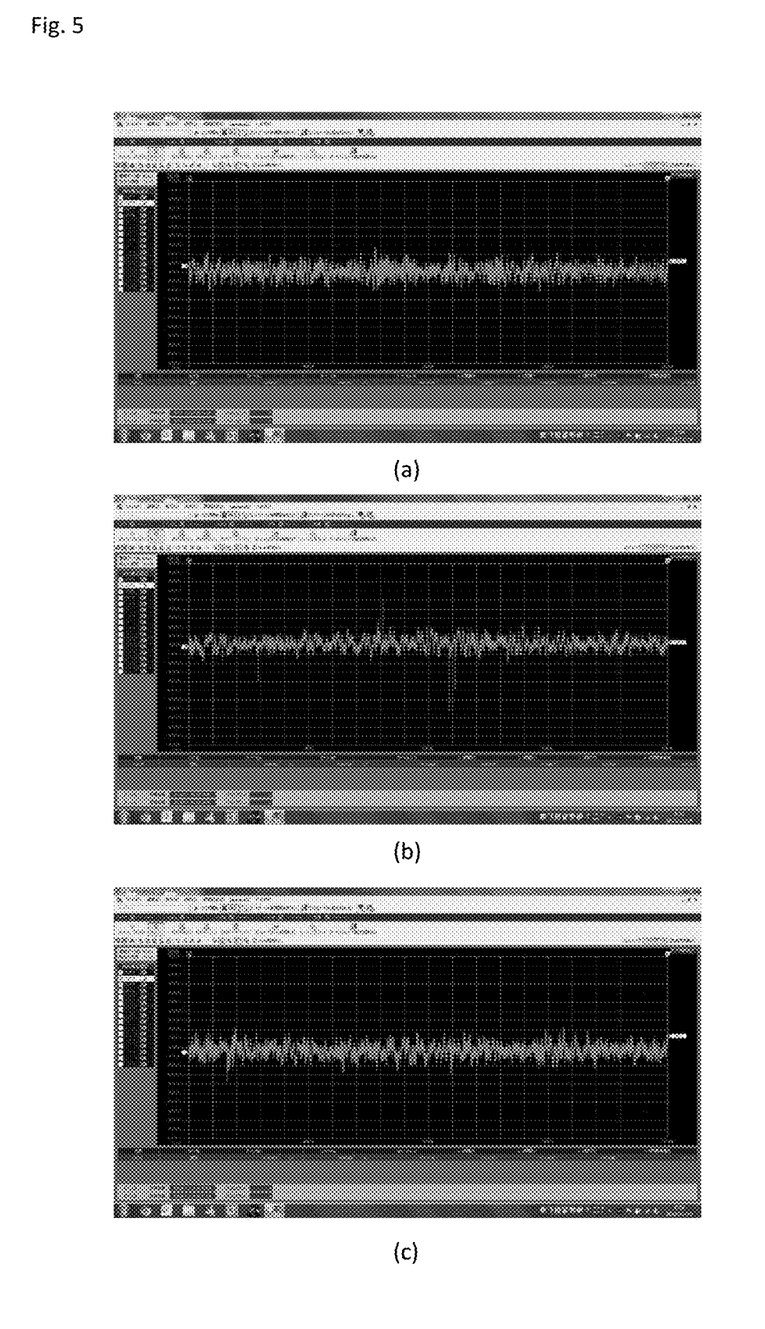
FIG. 5 is a graph showing the vibration measurement results measured using the wire electrical discharge machining device shown in FIG. 1.

FIGS. 4 and 5 are diagrams for describing the results of a comparison of the wire amplitude measurement values. Here, the vertical axis represents the amplitude (μm), and the horizontal axis represents time (sec). Measurement was performed for the wire electrode using an optical dimension measuring instrument. FIG. 4 shows the measurement result obtained using the wire electrical discharge machining device shown in FIG. 7, which shows a wire amplitude measurement result of 1.99 μm. FIG. 5 shows the measurement result obtained using the wire electrical discharge machining device shown in FIG. 1, which shows a wire amplitude measurement result on the order of 0.6 μm.

Next, description will be made with reference to FIGS. 4 and 5 and Table 1 regarding the vibration measurement results for various conditions. Here, the vertical axis represents the amplitude (μm), and the horizontal axis represents the time (sec). FIG. 4 and Table 1 show the measurement results obtained using the wire electrical discharge machining device shown in FIG. 1. FIG. 4 shows the measurement results obtained using the wire electrical discharge machining device shown in FIG. 7.

FIG. 5 shows the vibration measurement results obtained using the wire electrical discharge machining device shown in FIG. 1. FIG. 5A shows the measurement results obtained using a wire of ϕ0.205, WS=30, and WT=70. In this measurement, a wire amplitude measurement value of 0.61 μm was obtained. FIG. 5B shows the measurement results obtained using a wire of ϕ0.205 (new). In this measurement, a wire amplitude measurement value of 0.57 μm was obtained. FIG. 5C shows the measurement results obtained using a wire of ϕ0.203. In this measurement, a wire amplitude measurement value of 0.63 μm was obtained.

Figure 6:
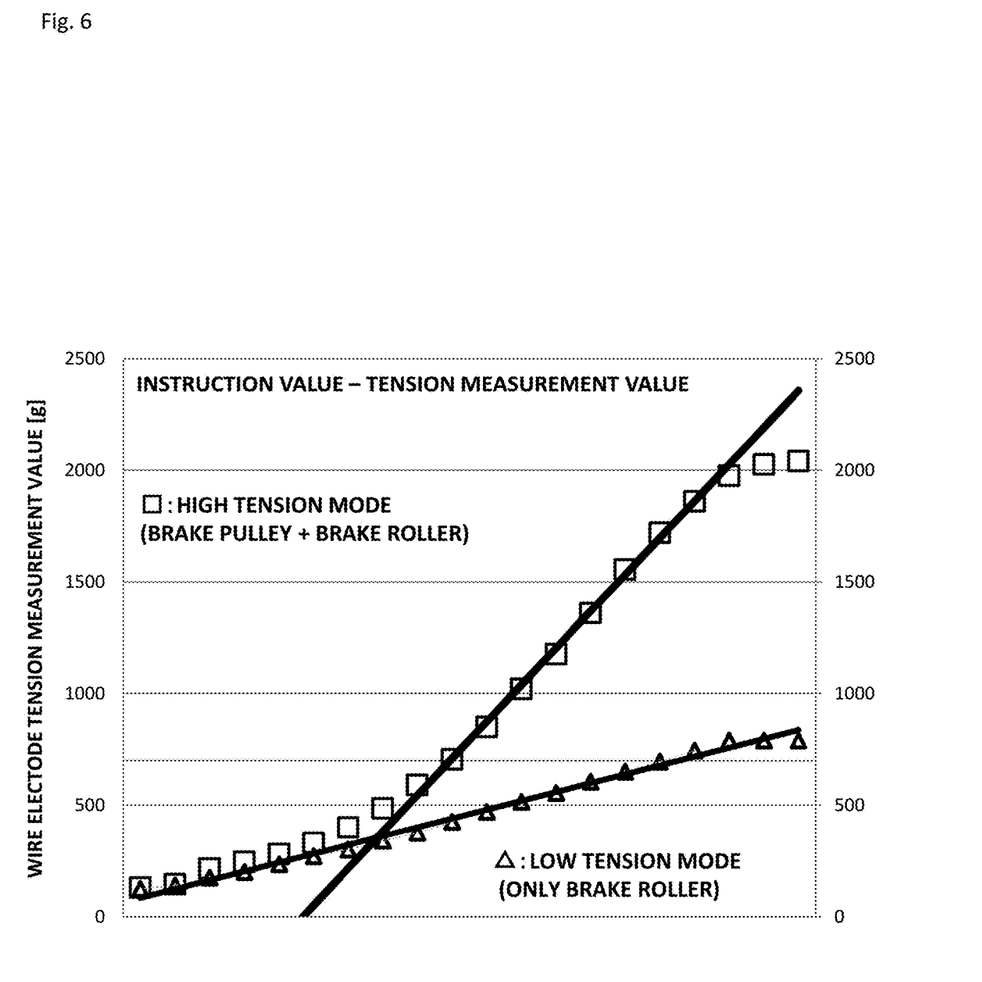
FIG. 6 shows the tension values measured using the wire electrical discharge machining device shown in FIG. 1.

FIG. 6 is a graph showing the relation between an instruction value and an actual measurement value. In this graph, the vertical axis represents the wire electrode tension measurement value (gf), and the horizontal axis represents the tension instruction value in the high tension setting mode and the tension instruction value in the low tension setting mode. The square symbols each represent the tension measurement value in the high tension setting mode in which the wire electrode is transferred via the high-tension brake pulley and the low tension brake roller. In this mode, each instruction value is obtained by equally dividing the range between 0 and 2.5 kgf by 20. On the other hand, the triangle symbols each represent the tension measurement value in the low tension setting mode in which the wire electrode is transferred via only the low-tension brake roller. In this mode, each instruction value is obtained by equally dividing the range between 0 and 1.0 kgf by 20. In this example shown in the drawing, the switching tension value is set to 700 gf.

REFERENCE SIGNS LIST 1 wire electrical discharge machining device, 3 source bobbin, 5 pillow roller, 7 guide roller, 9 guide roller, 11 dancer roller, 13 guide roller, 15 guide roller, 17 high-tension brake pulley, 18a, 18b, 18c small-diameter wire pressing roller, 19, 23 felt pad, 20 guide roller, 22 low-tension brake roller, 25 electrical discharge machining unit, 27a upper head, 27b lower head, 31 lower head roller, 33 nozzle holder, 35 winding unit, 37a pressing roller, 37b winding roller, 37c chute, 41 used wire hopper, 101 upper head, 103 lower head, 151 wire electrical discharge machining device, 153 source bobbin, 155 wire bobbin motor, 157 bobbin nut, 159 pillow roller, 161 guide roller, 163 dancer roller, 165 guide roller, 167 guide roller, 169 brake pulley, 171 brake roller, 173 guide roller, 175 guide roller, 177 guide roller, 179 electrical discharge machining unit, 181*a* upper head, 181*b* lower head, 183 lower head roller, 185 nozzle holder, 187 winding unit, 189*a* pressing roller, 189*b* winding roller, 193 used wire hopper.

The invention claimed is:

1. A wire electrode supply apparatus employed in a wire electrical discharge machining device comprising an electrical discharge machining unit that provides electrical discharge machining using a wire electrode, the wire electrode supply apparatus comprising:
    a back tension adjustment unit that adjusts a back tension applied to the wire electrode drawn from a source bobbin;
    a tension applying unit that is disposed downstream of the back tension adjustment unit and applies a tension, at the electrical discharge machining unit, to the wire electrode drawn from the source bobbin, the tension applying unit comprising a high tension applying unit and a low tension applying unit disposed downstream of the high tension applying unit; and
    a constant pressure ejecting unit that is disposed downstream of the tension applying unit and ejects the wire electrode in a state in which the wire electrode is pinched with a constant pressure after the wire electrode passes through the tension applying unit and the electrical discharge machining unit,
    wherein the high tension applying unit comprises a high-tension brake pulley,
    wherein, when the tension applying unit is to supply a tension that is higher than a switching tension value, the low tension applying unit applies a tension to the wire electrode
    after the high tension applying unit applies a tension to the wire electrode, where the tension applied by the low tension applying unit is lower than the tension applied by the high tension applying unit; and wherein, when the tension applying unit is to supply a tension that is lower than the switching tension value only the low tension applying unit applies a tension to the wire electrode and the high tension applying unit applies no tension to the wire electrode with the high-tension brake pulley rotating freely.

2. The wire electrode supply apparatus according to claim 1, wherein the low tension applying unit is positioned closer to the electrical discharge machining unit than the high tension applying unit is.

3. The wire electrode supply apparatus according to claim 1, wherein the high tension applying unit comprises a first brake and the high-tension brake pulley, and
    wherein the low tension applying unit comprises a second brake and a low-tension brake roller.

4. The wire electrode supply apparatus according to claim 3,
    wherein, when the tension applying unit is to supply a tension that is higher than the switching tension value, the low tension applying unit applies a tension to the wire electrode after the high tension applying unit applies a tension to the wire electrode, by providing a braking load with the first brake magnetically excited, and
    wherein, when the tension applying unit is to supply a tension that is lower than the switching tension value, only the low tension applying unit applies a tension to the wire electrode and the high tension applying unit applies no tension to the wire electrode with the first brake magnetically not excited, rotating freely, and not providing a braking load.

5. The wire electrode supply apparatus according to claim 3, wherein the
    high-tension brake pulley has a diameter that is greater than that of the low-tension brake roller, and
    wherein the wire electrode supply apparatus further comprises at least one small-diameter wire pressing roller that presses the wire electrode in contact with an outer circumference portion of the high-tension brake pulley so as to pinch the wire electrode, thereby applying a tension to the wire electrode.

6. The wire electrode supply apparatus according to claim 3, wherein the first brake is a hysteresis brake,
    and wherein the second brake is a powder brake.

7. The wire electrode supply apparatus according to claim 3, wherein the source bobbin, the high tension applying unit and the low tension applying unit have rotational axes that are in parallel with each other.

8. The wire electrode supply apparatus according to claim 1, wherein the back tension adjustment unit comprises a servo motor directly connected to the source bobbin, and a dancer roller that can be moved in a vertical direction.

9. The wire electrode supply apparatus according to claim 8, wherein the wire electrode is applied to the dancer roller through multiple turns, so as to reduce the weight to be applied to the wire electrode.

10. The wire electrode supply apparatus according to claim 1, wherein the constant pressure ejecting unit comprises:
    a lower head roller that is arranged on a downstream side of a lower head of the electrical discharge machining unit, and that changes a direction in which the wire electrode is transferred from a vertical direction to a horizontal direction;
    an ejecting unit that holds the wire electrode transferred in the horizontal direction such that the wire electrode is pinched between two rollers with a constant setting pressure determined based on the wire electrode, and that ejects the wire electrode with a constant setting rate; and
    a chute that takes in the wire electrode ejected in a state in which the wire electrode is pinched by means of the two rollers.

11. The wire electrode supply apparatus according to claim 1, further comprising a guide roller having a trapezoidal shape in cross-section, and arranged such that its small-diameter portion as viewed in cross-section is in contact with the wire electrode.

12. The wire electrode supply apparatus according to claim 1, wherein the low tension applying unit is arranged on a straight line that passes through an upper head and a lower head of the electrical discharge machining unit such that the low tension applying unit is positioned on an upper side of the upper head.

13. The wire electrode supply apparatus according to claim 1, wherein the low tension applying unit is configured to supply a tension in a range up to a reference tension value, and
    wherein the low tension applying unit provides a tension control value in a stepwise manner that is finer than that provided by the high tension applying unit.

14. The wire electrode supply apparatus according to claim 1, wherein the high tension applying unit comprises a hysteresis brake, wherein the low tension applying unit comprises a powder brake, wherein, when the tension applying unit is to supply a tension that is higher than the switching tension value, the powder brake applies a tension to the wire electrode after the hysteresis brake applies a tension to the wire electrode, by providing a braking load with the hysteresis brake magnetically excited, and wherein, when the tension applying unit is to supply a tension that is lower than the switching tension value, only the powder brake applies a tension to the wire electrode and the high tension applying unit applies no tension to the wire electrode with the hysteresis brake magnetically not excited, rotating freely, and not providing a braking load.

15. A wire electrode supply method employed in a wire electrical discharge machining device comprising an electrical discharge machining unit that provides electrical discharge machining using a wire electrode, the wire electrode supply method comprising:

back tension adjustment in which a back tension adjustment unit adjusts a back tension applied to the wire electrode drawn from a source bobbin;

tension applying in which a tension applying unit adjusts a tension applied to the wire electrode drawn from the source bobbin, at the electrical discharge machining unit; and constant pressure ejecting in which a constant pressure ejecting unit ejects the wire electrode with a constant rate in a state in which the wire electrode is pinched with a constant pressure after the wire electrode passes through the tension applying unit and the electrical discharge machining unit, wherein the tension applying unit comprises a high tension applying unit and a low tension applying unit disposed downstream of the high tension applying unit, and each configured to apply a tension to the wire electrode;

wherein the low tension applying unit is configured to supply a tension in a range up to a reference tension value, wherein the high tension applying unit is configured to supply a tension that is higher than the reference tension value, wherein, during the tension applying, when the tension applying unit is to supply a tension that is higher than a switching tension value, which is equal to or lower than the reference tension value, the low tension applying unit applies a tension to the wire electrode after the high tension applying unit applies a tension to the wire electrode by providing a braking load, and wherein, during the tension applying, when the tension applying unit is to supply a tension that is lower than the switching tension value, only the low tension applying unit applies a tension to the wire electrode and the high tension applying unit provides no braking load and applies no tension to the wire electrode.

16. The wire electrode supply method according to claim 15, wherein the low tension applying unit is positioned closer to the electrical discharge machining unit than the high tension applying unit is.

17. The wire electrode supply method according to claim 15, wherein the high tension applying unit comprises a first brake and a high-tension brake pulley, and wherein the low tension applying unit comprises a second brake and a low-tension brake roller.

18. The wire electrode supply method according to claim 17, wherein, when the tension applying unit is to supply a tension that is higher than the switching tension value, the low tension applying unit applies a tension to the wire electrode after the high tension applying unit applies a tension to the wire electrode, by providing a braking load with the first brake magnetically excited, and wherein, when the tension applying unit is to supply a tension that is lower than the switching tension value, only the low tension applying unit applies a tension to the wire electrode and the high tension applying unit applies no tension to the wire electrode with the first brake magnetically not excited, rotating freely, and not providing a braking load.

19. The wire electrode supply method according to claim 17, wherein the first brake is a hysteresis brake, and wherein the second brake is a powder brake.

20. The wire electrode supply method according to claim 15, wherein the high tension applying unit comprises a hysteresis brake, and wherein the low tension applying unit comprises a powder brake, wherein, when the tension applying unit is to supply a tension that is higher than the switching tension value, the powder brake applies a tension to the wire electrode after the hysteresis brake applies a tension to the wire electrode, by providing a braking load with the hysteresis brake magnetically excited, and wherein, when the tension applying unit is to supply a tension that is lower than the switching tension value, only the powder brake applies a tension to the wire electrode and the high tension applying unit applies no tension to the wire electrode with the hysteresis brake magnetically not excited, rotating freely, and not providing a braking load.

* * * * *